UNITED STATES PATENT OFFICE.

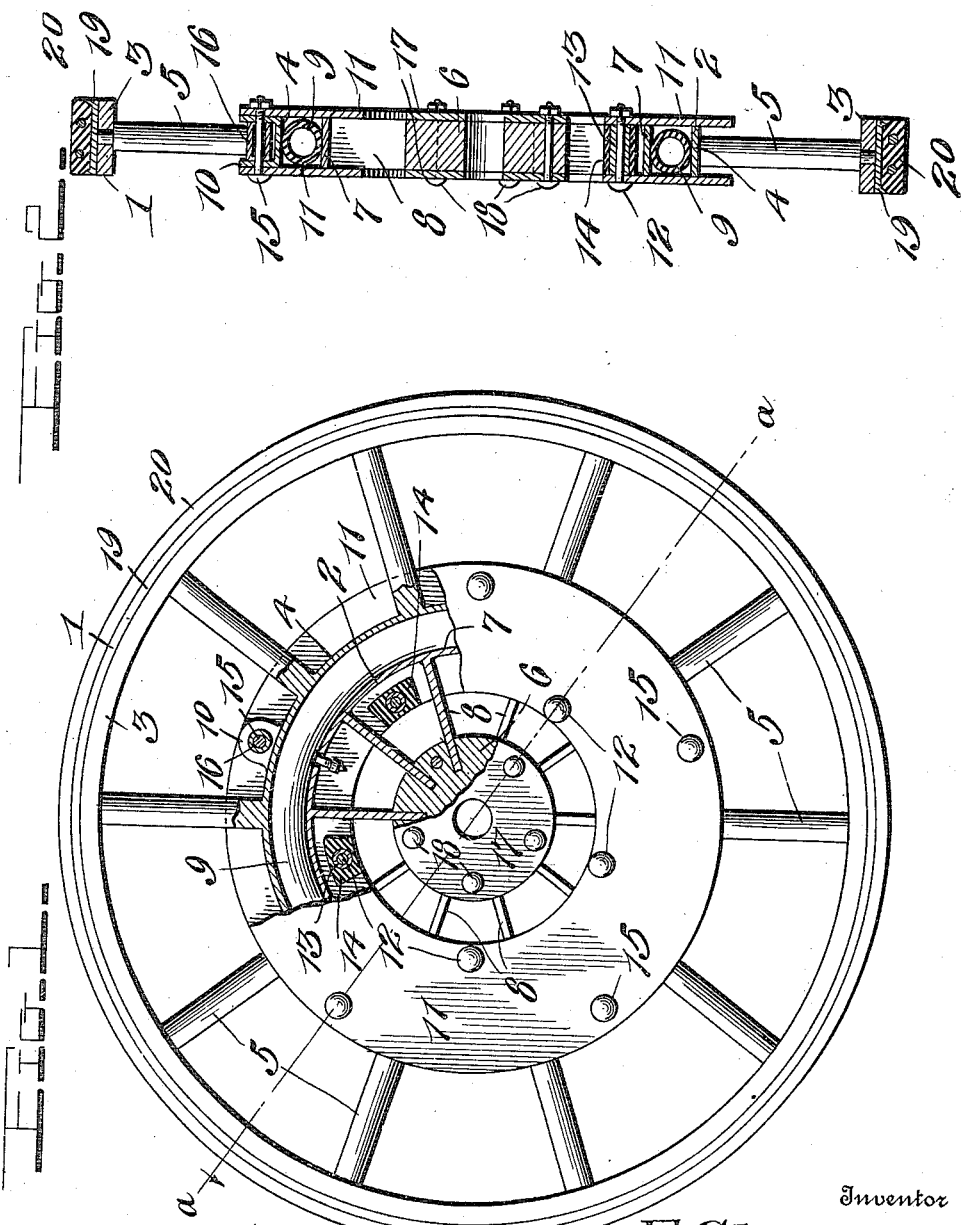

EDWARD STEWART, OF KANSAS CITY, MISSOURI.

SPRING-WHEEL.

985,639.  Specification of Letters Patent.  Patented Feb. 28, 1911.

Application filed October 15, 1910. Serial No. 587,256.

*To all whom it may concern:*

Be it known that I, EDWARD STEWART, a citizen of the United States, residing at Kansas City, in the county of Jackson and State of Missouri, have invented certain new and useful Improvements in Spring-Wheels, of which the following is a specification, reference being had to the accompanying drawings.

This invention relates to improvements in cushioned wheels or spring wheels especially adapted for use on automobiles but also adapted for use on other vehicles, the invention consisting in the construction, combination and arrangement of devices hereinafter described and claimed.

In the accompanying drawings Figure 1 is partly an elevation and partly a sectional view of a wheel constructed in accordance with my invention; and Fig. 2 is a transverse sectional view of the same.

My improved wheel comprises an outer member 1 and an inner member 2. The outer member comprises a felly or rim 3, an inner rim 4, and spoke sections 5 which connect the said rims together. The inner member comprises a hub 6, a rim 7 disposed concentrically therewith and spoke sections 8 which connect the said hub and the said rim, the inner portions of the said spoke sections being here shown as secured in radial recesses with which the hub is provided. In practice, the spoke sections 8 may be formed integrally with the rim 7.

A cushioning device 9 which is here shown as a circular rubber tube or tire pneumatically inflated is disposed between the outer rim 7 of the inner member of the wheel and the inner rim 4 of the outer member of the wheel. The said cushioning device supports the outer member of the wheel on the inner member thereof and admits of eccentric movement of the inner member in the outer member, as will be understood, the said cushioning device serving to take up all shocks incident to the passing of the wheel over a road surface and serving to make the wheel and the vehicle on which it is mounted ride easily and smoothly.

The rim 4 is provided on opposite sides, at points intermediate certain of the outer spoke sections 5 with pairs of radially projecting lugs 10. The inner and outer members of the wheel are connected together by a pair of annular plates 11 which are disposed on opposite sides thereof and cover the outer portion of the inner wheel member and the inner portion of the outer wheel member. The said plates are secured to the inner wheel member by bolts 12 which pass therethrough and through the spaces between certain of the inner spoke sections 8. Spacing sleeves 13 are placed on the said bolts, the ends of which bear against the opposing sides of the said annular plates 11 and the said spacing sleeves extend through cushioning blocks 14 which are also disposed in the spaces between certain of the said inner spoke sections and in practice are preferably made of rubber but may be made of any other suitable elastic material. The said annular plates 11 are secured to the inner rim 4 of the outer wheel member by means of bolts 15 which extend through said plates and through the said lugs 10 and on the said bolts are spacing sleeves 16, the ends of which bear against the opposing inner sides of the said lugs, the plates 11 bearing not only against the side edges of the inner rim 4 of the outer wheel member but also against the outer sides of the said lugs 10.

The ends of the hub are covered by circular plates 17 which also cover the inner, embedded ends of the inner hub sections, said plates being secured to the hub by means of suitable bolts or screws 18 and, together with the hub, having a central opening for the reception of the axle spindle.

The felly 3 of the outer wheel member is here shown as provided with an iron or steel tire band 19 channeled in its outer face and with a solid rubber tire 20 secured in the said channel of the tire band by means of the usual securing wires 21.

The inner wheel member is free to move eccentrically with respect to the outer wheel member and such movements are cushioned by the pneumatic tire or other cushioning device 9. The plates 11 which bear against the outer sides both of the outer wheel member and the inner wheel member keep the said wheel members in line and prevent the wheel from buckling or dishing. The bolts which connect the outer portions of the said plates to the inner rim of the outer wheel tire and the bolts which are secured to the inner portions of the plates and pass through the spaces between the spoke sections of the inner wheel member greatly strengthen and reinforce the said plates and contribute greatly to the strength and durability of the wheel. Owing to the disposition of the inner bolts 12 in the spaces between the spoke sections of the inner wheel member, the said inner wheel member is free to move eccentrically, within the limits of the movements of the cushioning tire or other device 9 and is also free to move angularly to some extent with respect to the outer wheel member so that the wheel is rendered exceedingly mobile and resilient. The extent of the angular movement of the inner wheel member with respect to the outer wheel member is limited by the cushioning blocks on the inner bolts 12, said cushioning blocks, when there has been a slight angular movement of this character, in either direction, coming in contact with certain of the inner spoke sections and co-acting therewith to cushion and limit such angular movement. This construction and arrangement of devices which provides for cushioned angular movement of the inner section with reference to the outer section, as well as eccentric movement of the said sections contribute greatly to the elasticity of the wheel and greatly enhances the durability thereof and minimizes wear of the outer tire and also of the inner, cushioning tire.

Having thus described my invention, I claim:

1. In a wheel of the class described, the combination of an inner member comprising a hub, a rim and spoke sections connecting said hub and rim, with an outer member comprising an inner rim, an outer rim, and spoke sections connecting said rims, annular plates on opposite sides of the inner portion of the outer member and the outer portion of the inner member, bolts securing the said plates to the inner rim of the outer member and bolts connecting the said plates and passing through the spaces between certain of the spoke sections of the inner member, and a cushioning device between the rim of the inner member and the inner rim of the outer member and held in place by the said annular plates, the latter and the said bolts connecting the inner and outer wheel members together and co-acting with the said cushioning device to provide for eccentric and angular movement of the said wheel members with respect to each other, the said bolts which connect the said plates to the inner wheel member being provided with cushioning devices to co-act with the spokes of the inner wheel member to limit and cushion the angular movement of the said wheel members.

2. In a wheel of the class described, the combination of an inner member comprising a hub, a rim, and spoke sections connecting said hub and rim, with an outer member comprising an inner rim, an outer rim and spoke sections connecting said rims, annular plates on opposite sides of the inner portion of the outer member, and the outer portion of the inner member, bolts securing the said plates to the inner rim of the outer member, bolts connecting the said plates, and passing through the spaces between certain of the spoke sections of the inner member, spacing sleeves on the last mentioned bolts disposed between the said plates, cushioning blocks also between the said plates and through which the spacing sleeves extend, the said cushioning blocks coacting with the spokes of the inner wheel member to limit and cushion the angular movement of the said wheel members, and a cushioning device between the rim of the inner member and the inner rim of the outer member, and held in place by the said annular plates, the latter and the said bolts which connect the inner and outer wheel members together, coacting with the said cushioning device to permit the eccentric and angular movement of the said wheel members with respect to each other.

In testimony whereof I hereunto affix my signature in the presence of two witnesses.

EDWARD STEWART.

Witnesses:
J. W. GARNER,
GEO. S. LIVINGSTON.

---

Copies of this patent may be obtained for five cents each, by addressing the "Commissioner of Patents, Washington, D. C."